United States Patent
Wang et al.

(10) Patent No.: US 11,307,034 B2
(45) Date of Patent: Apr. 19, 2022

(54) GYROSCOPE, ELECTRONIC DEVICE AND METHOD OF DETECTING ANGULAR VELOCITY

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Ying Wang, Beijing (CN); Tien Lun Ting, Beijing (CN); Xue Cao, Beijing (CN); Peizhi Cai, Beijing (CN); Hao Liu, Beijing (CN); Chuncheng Che, Beijing (CN); Hailin Xue, Beijing (CN); Xibin Shao, Beijing (CN); Jie Wu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 490 days.

(21) Appl. No.: 16/337,581

(22) PCT Filed: Sep. 4, 2018

(86) PCT No.: PCT/CN2018/103985
§ 371 (c)(1),
(2) Date: Mar. 28, 2019

(87) PCT Pub. No.: WO2019/114329
PCT Pub. Date: Jun. 20, 2019

(65) Prior Publication Data
US 2021/0333105 A1    Oct. 28, 2021

(30) Foreign Application Priority Data

Dec. 13, 2017   (CN) .......................... 201711329755.6

(51) Int. Cl.
*G01C 19/34* (2006.01)
*G01C 19/66* (2006.01)
(Continued)

(52) U.S. Cl.
CPC ........... *G01C 19/661* (2013.01); *G01C 19/34* (2013.01); *G01C 19/56* (2013.01); *G01C 19/64* (2013.01);
(Continued)

(58) Field of Classification Search
CPC ...... G01C 19/661; G01C 19/34; G01C 19/56; G01C 19/64; G01C 19/72; G01C 19/66; H04M 1/21
See application file for complete search history.

(56) References Cited

U.S. PATENT DOCUMENTS

| | | | |
|---|---|---|---|
| 3,778,163 A | 12/1973 | Forward | |
| 5,137,353 A | 8/1992 | Seegmiller | |

(Continued)

FOREIGN PATENT DOCUMENTS

| | | |
|---|---|---|
| CN | 1108383 A | 9/1995 |
| CN | 1190734 A | 8/1998 |

(Continued)

OTHER PUBLICATIONS

International Search Report and Written Opinion dated Dec. 3, 2018 from State Intellectual Property Office of the P.R. China.
(Continued)

*Primary Examiner* — Jonathan M Hansen
(74) *Attorney, Agent, or Firm* — Dilworth & Barrese, LLP.; Michael J. Musella, Esq.

(57) ABSTRACT

A gyroscope, an electronic device and a method of detecting an angular velocity. The gyroscope includes: a photoelectric detector and a light source, wherein the light source is movable relative to the photoelectric detector, and light
(Continued)

emitted by the light source is able to be irradiated onto the photoelectric detector.

16 Claims, 6 Drawing Sheets

(51) Int. Cl.
*G01C 19/56* (2012.01)
*G01C 19/64* (2006.01)
*G01C 19/72* (2006.01)
*H04M 1/21* (2006.01)

(52) U.S. Cl.
CPC .............. *G01C 19/66* (2013.01); *G01C 19/72* (2013.01); *H04M 1/21* (2013.01)

(56) References Cited

U.S. PATENT DOCUMENTS

| | | | |
|---|---|---|---|
| 5,838,432 A | 11/1998 | Tokuhashi et al. | |
| 5,909,311 A | 6/1999 | Ohtomo et al. | |
| 6,563,587 B1 | 5/2003 | Bueschelberger et al. | |
| 8,904,867 B2 * | 12/2014 | Martin | G06F 3/0317 73/514.26 |
| 2009/0308158 A1 * | 12/2009 | Bard | G01P 15/18 73/514.26 |
| 2015/0293415 A1 | 10/2015 | Wang et al. | |
| 2018/0107059 A1 | 4/2018 | Zhao et al. | |

FOREIGN PATENT DOCUMENTS

| | | |
|---|---|---|
| CN | 101369059 A | 2/2009 |
| CN | 102478856 A | 5/2012 |
| CN | 103091014 A | 5/2013 |
| CN | 103941470 A | 7/2014 |
| CN | 104407411 A | 3/2015 |
| CN | 204269847 U | 4/2015 |
| CN | 105572957 A | 5/2016 |
| CN | 105572984 A | 5/2016 |
| CN | 105928456 A | 9/2016 |
| CN | 107941207 A | 4/2018 |
| JP | S63222267 A | 9/1988 |
| JP | 08320217 A | 12/1996 |
| JP | H11183177 A | 7/1999 |

OTHER PUBLICATIONS

Third Office Action dated Sep. 7, 2020, by the Chinese Patent Office in Chinese application No. 201711329755.6.

Second Office Action dated Mar. 19, 2020, by the Chinese Patent Office in Chinese application No. 201711329755.6 and its English translation.

The None-fulcrum Laser Polarization Light Angular Sensor, Su Meikai, Department of Opto-electronic Engineering, Beijing Institute of Technology, Beijing 100081, Laser Journal, vol. 24, No. 3, 2003.

* cited by examiner

GYROSCOPE, ELECTRONIC DEVICE AND METHOD OF DETECTING ANGULAR VELOCITY

CROSS-REFERENCE TO RELATED APPLICATIONS

The application claims priority to Chinese patent application No. 201711329755.6, filed on Dec. 13, 2017, the entire disclosure of which is incorporated herein by reference as part of the present application.

TECHNICAL FIELD

Embodiments of the present disclosure relate to a gyroscope, an electronic device and a method of detecting an angular velocity.

BACKGROUND

A gyroscope is an inertial navigation instrument, which is capable of accurately determining the orientation of a moving object. The gyroscope can provide accurate signals such as azimuth, level, position, velocity or acceleration as needed to control the attitude and the motion direction of the moving object. Gyroscopes are widely used in the fields of mine tunnels, underground railways, oil drilling, aviation, aerospace, navigation, national defense industries and so on, and play an important role in modern national defense construction and national economy construction. With the development of technology, gyroscopes are also widely used in electronic devices such as mobile phones, e-books, tablet computers, game consoles, etc., to sense the motion orientation of electronic devices, which is convenient for electronic devices to provide users with a better user experience.

SUMMARY

At least one embodiment of the present disclosure provides a gyroscope, comprising a photoelectric detecting component and a light source, wherein the light source is movable relative to the photoelectric detecting component, and light emitted by the light source is able to be irradiated onto the photoelectric detecting component.

For example, in the gyroscope provided by an embodiment of the present disclosure, the light source is a polarization light source, and the gyroscope further comprises a polarization analyzing component for polarization light, wherein the polarization light source is movable relative to the polarization analyzing component for polarization light, and polarization light emitted by the polarization light source is able to be irradiated onto the photoelectric detecting component through the polarization analyzing component for polarization light.

For example, in the gyroscope provided by an embodiment of the present disclosure, the polarization analyzing component for polarization light comprises: a first substrate and a second substrate opposite to each other; and a liquid crystal layer between the first substrate and the second substrate, wherein the liquid crystal layer comprises a dichroic dye added to liquid crystal molecules.

For example, in the gyroscope provided by an embodiment of the present disclosure, the polarization analyzing component for polarization light comprises a first substrate and a first polarizer on the first substrate.

For example, in the gyroscope provided by an embodiment of the present disclosure, the polarization analyzing component for polarization light further comprises: a second substrate, a second polarizer on the second substrate, and a liquid crystal layer between the first substrate and the second substrate.

For example, the gyroscope provided by an embodiment of the present disclosure further comprises driving electrodes, wherein the driving electrodes are on the first substrate and/or the second substrate to drive deflection of liquid crystal molecules in the liquid crystal layer.

For example, the gyroscope provided by an embodiment of the present disclosure further comprises a controller, wherein the controller is configured to be in signal connection to the photoelectric detecting component to receive a detecting signal of the photoelectric detecting component, and is configured to control driving voltages applied to the driving electrodes.

For example, the gyroscope provided by an embodiment of the present disclosure further comprises an elastomer, wherein the elastomer allows the light source and the photoelectric detecting component to be directly or indirectly connected, and an end, which is far away from the light source, of the elastomer is further connected to a power supply to supply power to the light source.

For example, in the gyroscope provided by an embodiment of the present disclosure, the photoelectric detecting component is on a light emitting side of the second substrate.

At least one embodiment of the present disclosure further provides an electronic device, comprising the gyroscope provided by any one of the embodiments of the present disclosure.

At least one embodiment of the present disclosure further provides a method of detecting an angular velocity, comprising: allowing a light source that is movable to perform an angular movement with a motion state of a detected object; allowing light emitted by the light source to be irradiated onto a photoelectric detecting component, and allowing illumination areas irradiated onto the photoelectric detecting component in different motion states to be different; obtaining a detecting result provided by the photoelectric detecting component; and obtaining a change in intensity of the light irradiated onto the photoelectric detecting component from the detecting result to obtain the angular movement of the light source.

For example, in the method of detecting the angular velocity provided by an embodiment of the present disclosure, the light source is a polarization light source, and allowing the light emitted by the light source to be irradiated onto the photoelectric detecting component, and allowing illumination areas irradiated onto the photoelectric detecting component in different motion states to be different, comprises: allowing polarization light emitted by the polarization light source to be irradiated onto the photoelectric detecting component through the polarization analyzing component for polarization light, and allowing intensity of the light irradiated onto the photoelectric detecting component in different motion states to be different.

For example, in the method of detecting the angular velocity provided by an embodiment of the present disclosure, the polarization analyzing component for polarization light comprises a liquid crystal cell, and the liquid crystal cell comprises a liquid crystal layer; the liquid crystal layer in the liquid crystal cell comprises liquid crystal into which a dichroic dye is added; a deflection angle of liquid crystal molecules in the liquid crystal layer is controlled by driving voltages of the liquid crystal cell, and the method further comprises: subsequent to obtaining the detecting result provided by the photoelectric detecting component, adjusting the driving voltages of the liquid crystal cell to control deflection of liquid crystal molecules, allowing the detecting result provided by the photoelectric detecting component to reach an initial value, and recording corresponding values of the driving voltages; and obtaining an angular movement of the polarization light source from the change in intensity of the light and the values of the driving voltages.

BRIEF DESCRIPTION OF THE DRAWINGS

In order to clearly illustrate the technical solution of the embodiments of the disclosure, the drawings of the embodiments will be briefly described in the following. It is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The detecting principle of the gyroscope includes the Sagnac effect, the capacitance principle or other principles. According to different detecting principles, gyroscopes include laser gyroscopes, optical fiber gyroscopes, maglev gyroscopes, micro-mechanical gyroscopes, and the like. At present, common gyroscopes mainly comprise a mechanical structure or a micro-electro-mechanical system (MEMS) structure. The manufacturing process comprises a traditional mechanical process or an MEMS process. The manufacturing process of a gyroscope is complicated, the equipment in back-end processes is expensive, the precision of process is high, the productivity is low, the accuracy is poor, the integration degree is low, the cost is high, and the application scope of the gyroscopes of different principles is limited.

At least one embodiment of the present disclosure provides a gyroscope, an electronic device, and a method of detecting an angular velocity. The gyroscope provided by at least one embodiment has advantages of low cost and simple structure, and can also have advantages of high integration, accurate measurement, high precision or the like by suitable processes. For example, the gyroscope provided by at least one embodiment can be applied to TFT-LCD production lines, so that the gyroscope can be used to integrate with any device including a liquid crystal cell such as a display device, a liquid crystal antenna, or the like.

Hereinafter, at least one embodiment of the present disclosure will be described in detail with reference to the accompanying drawings. It should be noted that the same reference numeral will be used in different drawings to refer to the same described component.

At least one embodiment of the present disclosure provides a gyroscope, comprising a photoelectric detecting component and a light source. The light source is movable relative to the photoelectric detecting component, and light emitted by the light source is able to be irradiated onto the photoelectric detecting component.

Figure 1:
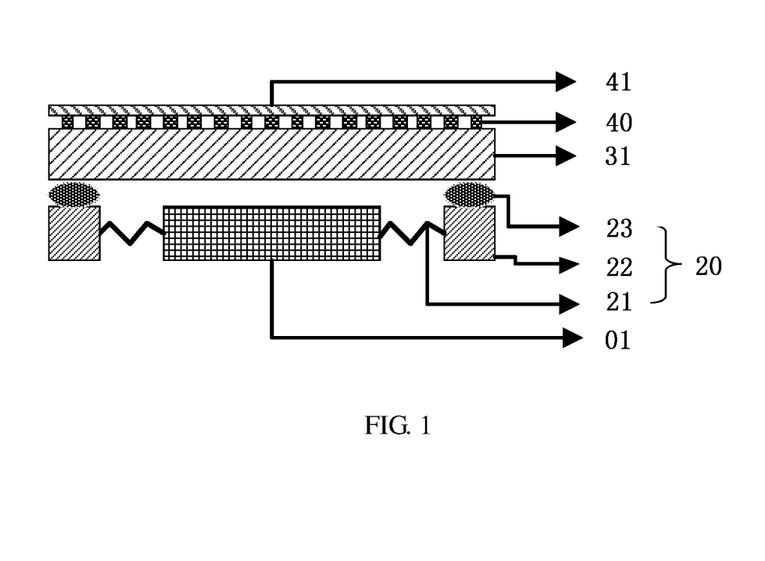
FIG. 1 is a cross-sectional schematic diagram of a gyroscope provided by an embodiment of the present disclosure.

FIG. 1 is a cross-sectional schematic diagram of a gyroscope provided by an embodiment of the present disclosure. Referring to FIG. 1, the gyroscope includes a light source 01, a sealing structure 20, a first substrate 31, a photoelectric detecting component 40, and a protective layer 41. As illustrated in the figure, the light source 01 is movable relative to the photoelectric detecting component 40, and light emitted by the light source 01 can be irradiated onto the photoelectric detecting component 40. Thereby, the photoelectric detecting component 40 can detect the light irradiated on the photoelectric detecting component. The light source 01 is connected (e.g., fixed) to the first substrate 31, for example, by the sealing structure 20. Here, the light source 01 is a surface light source which is used for providing light, for example, emitting light upward as illustrated in the figure. Certainly, the embodiments of the present disclosure include, but are not limited to, the surface light source. The light source 01 can be any uniform light source, such as a line light source or a point light source, and the above-mentioned surface light source also can be obtained by combining line light sources or point light sources. The light source 01 can be an ordinary light source or a polarization light source, which is not limited in the embodiments of the present disclosure.

The light source 01 is connected to the first substrate 31, for example, by the sealing structure 20, so that the light source 01 is movable relative to the first substrate 31 (or the photoelectric detecting component 40) under the action of an external force or the like. The movement is not limited to a translation in a plane parallel to the first substrate 31, and may also include a movement in a direction oblique to the plane, thereby movements in a plurality of directions can be detected. When the light source 01 performs an angular movement, the area and intensity of the light, which is emitted by the light source 01, irradiated onto the photoelectric detecting component 40 are changed, so the angular movement of the light source 01 is obtained through the change in the illumination area and the change in the intensity of the light. For example, the sealing structure 20 includes an elastomer 21, a frame 22 and a sealing component 23. The elastomer 21 allows the light source 01 and the frame 22 to be in a movable connection. The sealing component 23 allows the frame 22 and the first substrate 31 to be connected. The sealing component 23 can be a snap connection, a threaded connection, an adhesive connection, or the like.

For example, the photoelectric detecting component 40 is disposed on a light emitting side of the first substrate 31, and the photoelectric detecting component 40 is configured to detect the change in the intensity of the light at different positions after the angular movement of the light source 01, and is configured to transmit the detecting signals to a controller (not shown). The photoelectric detecting component 40 may comprise various forms, for example, comprise a plurality of photoelectric detecting units, and each of the photoelectric detecting units comprises a photoelectric conversion electrode(s). Theses photoelectric conversion electrodes are in an array arrangement in a predetermined region on the first substrate 31. The protective layer 41 is disposed on the photoelectric detecting component 40, and is mainly configured to protect and insulate the photoelectric detecting component 40.

Figure 2:
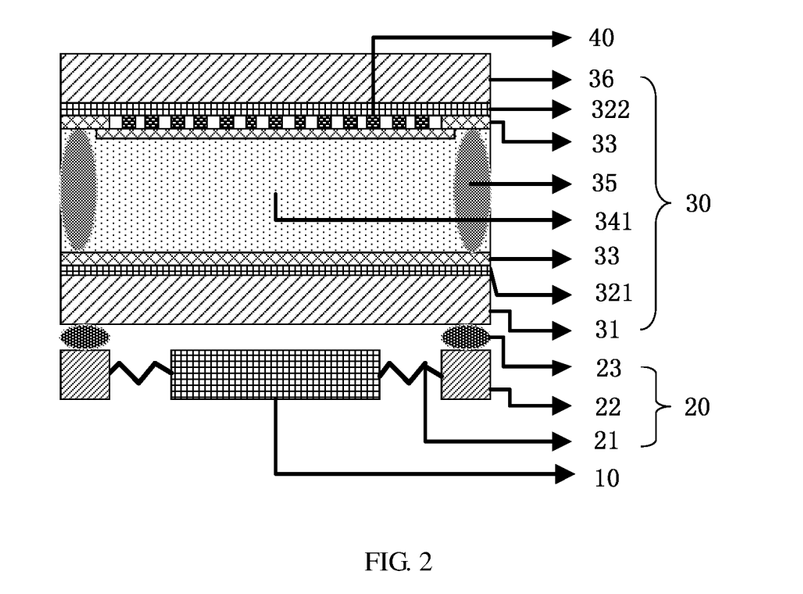
FIG. 2 is a cross-sectional schematic diagram of another gyroscope provided by an embodiment of the present disclosure.

FIG. 2 is a cross-sectional schematic diagram of another gyroscope provided by an embodiment of the present disclosure. The plane schematic diagram of the gyroscope can be at least partially referred to FIG. 3. Referring to FIG. 2, the gyroscope includes a polarization light source 10, a sealing structure 20, a polarization analyzing component for polarization light 30, and a photoelectric detecting component 40. As illustrated in the figure, the polarization light source 10 is movable relative to the polarization analyzing component for polarization light 30, and polarization light emitted by the polarization light source 10 is irradiated onto the photoelectric detecting component 40 through the polarization analyzing component for polarization light 30, so the photoelectric detecting component 40 can detect the polarization light irradiated on the photoelectric detecting component. The polarization light source 10 is connected (e.g., fixed) to the polarization analyzing component for polarization light 30, for example, by the sealing structure 20. By this detecting method, it is easier to detect the change in the intensity of the light under slight vibration, and the sensitivity of the detection is high.

Here, the polarization light source 10 is a surface light source which is used for providing polarization light, for example, emitting polarization light upward as illustrated in FIG. 2, and the polarization light comprises a polarized direction. Certainly, the embodiments of the present disclosure include, but are not limited to, the surface light source. The polarization light source 10 can be any uniform light source, such as a line light source or a point light source, and the above-mentioned surface light source also can be obtained by combining line light sources or point light sources, as long as the polarization light emitted by these line light sources or point light sources comprises the same polarized direction. The configuration of the polarization light source 10 is not limited, and for example, may be a combination of an organic light emitting diode (OLED) light source and a polarizer. The polarizer can be, for example, a polyvinyl alcohol (PVA) film prepared by a stretching process, or can be a wire grid obtained by a patterning process. The polarization light source 10 may also comprise other configurations, which is not limited in the embodiments of the present disclosure.

The polarization light source 10 is connected to the polarization analyzing component for polarization light 30, for example, by the sealing structure 20, so that the polarization light source 10 is movable relative to the polarization analyzing component for polarization light 30 under the action of an external force or the like. The movement is not limited to a translation in a plane parallel to the polarization analyzing component for polarization light 30, and may also include a movement in a direction oblique to the plane, thereby movements in a plurality of directions can be detected. For example, the sealing structure 20 includes an elastomer 21, a frame 22 and a sealing component 23. The elastomer 21 allows the polarization light source 10 and the frame 22 to be in a movable connection. The sealing component 23 allows the frame 22 and the polarization analyzing component for polarization light 30 to be connected. The sealing component 23 can be a snap connection, a threaded connection, an adhesive connection, or the like.

It should be noted that, in each embodiment of the present disclosure, the sealing structure 20 is not limited to the above-mentioned structures, and may be any structure as long as the polarization light source 10 and the polarization analyzing component for polarization light 30 are in a movable connection. The material of the frame 22 is not limited, and may be a thermosetting resin, glass, silicon or other suitable materials. A suitable process may be used for the sealing process according to the sealing component 23. The elastomer 21 may be a spring, a rubber or other suitable components as long as it can allow the polarization light source 10 to move flexibly with the angular movement. For example, when the elastomer 21 is a spring or a component comprising other metal materials, it can also have an electrical conduction function to supply power to the polarization light source 10.

According to the shape of the polarization light source 10 (for example, a rectangle, a square, etc.), the elastomer 21 may be connected to two sides of the polarization light source 10, may be connected to four sides of the polarization light source 10, or may be connected to the polarization light source 10 by other suitable manners. In addition to being in an adhesive connection, a snap connection or other suitable connections to the polarization analyzing component for polarization light 30, the frame 22 can also be integrally formed with the polarization analyzing component for polarization light 30, in which case the separate sealing component 23 can be omitted.

For example, the sealing component 23 may render the surface of the frame 22 to be completely attached to the polarization analyzing component for polarization light 30, or may allow the partial surface of the frame 22 to be connected to the polarization analyzing component for polarization light 30 by several connection points.

The polarization analyzing component for polarization light 30 can be implemented in various forms. For example, in the embodiment as illustrated in FIG. 2, the polarization analyzing component for polarization light 30 includes a first substrate 31, alignment layers 33, a liquid crystal layer 341 into which a dichroic dye is added, spacers 35, and a second substrate 36. The first substrate 31 and the second substrate 36 are disposed opposite to each other, and the liquid crystal layer 341 into which the dichroic dye is added is filled between the two substrates. Addition of the dichroic dye into the liquid crystal allows the liquid crystal to possess a high sensitivity characteristic to the polarized direction of the polarization light, so that the position change and the angle change of the polarization light source 10 with respect to the polarization analyzing component for polarization light 30 can be sensed. The dichroic dye includes, but is not limited to, an orchid dye, an azo dye, an anthraquinone dye and the like, and the selected dichroic dye needs to satisfy the requirement of having different extinction coefficients for parallel polarization light and vertical polarization light. The process of filing the liquid crystal comprises, but is not limited to, dripping, injecting and the like. For example, the alignment direction of liquid crystal molecules in the initial state is not limited, as long as the long-axis direction of liquid crystal molecules and the polarized direction of the polarization light emitted by the polarization light source 10 is allowed to be equal, so that the transmittance of the polarization light through the liquid crystal layer in the initial state can be the largest.

In an example of an embodiment, the above-mentioned polarization analyzing component for polarization light 30 may further include first driving electrodes 321 and second driving electrodes 322. The first driving electrodes 321 and one alignment layer 33 are disposed on the first substrate 31. The second driving electrodes 322 and another alignment layer 33 are disposed on the second substrate 36. The first driving electrodes 321 and the second driving electrodes 322 are configured to work in cooperation with each other, and for example, different driving voltages are applied to the first driving electrodes 321 and the second driving electrodes 322 by a driving voltage generating circuit (for example, a gamma circuit, not shown) under the control of the controller (referring to FIG. 5), so that an electric field is formed between the first driving electrodes 321 and the second driving electrodes 322. The deflection angle of liquid crystal molecules in the liquid crystal layer 341 into which the dichroic dye is added can be controlled by the electric field, thereby for example, ensuring the consistency of the liquid crystal layer, allowing the liquid crystal layer to return to the initial state, or the like.

In the above example, the first driving electrodes and the second driving electrodes can be disposed on the first substrate and the second substrate respectively to obtain a liquid crystal cell of vertical electric field type. In another example, the first driving electrodes and the second driving electrodes can also be disposed both on the first substrate, or both on the second substrate, so as to obtain a liquid crystal cell of horizontal electric field type, and the liquid crystal cell of horizontal electric field type may be an in-plane switching (IPS) or a fringe field switching (FFS). The first driving electrodes and the second driving electrodes can also be in other suitable arrangements.

The material for preparing the first driving electrodes and the second driving electrodes is not limited, and may be a light-transmitting conductive material such as ITO, ZnO, SnO2 or the like, or a conductive metal material such as Al, Cu, Mo, Cr or the like. The process for preparing the first driving electrodes and the second driving electrodes may comprise, but may not be limited to, a sputtering coating process, a photolithography process, and the like.

The first substrate 31 and the second substrate 36 are configured to support, protect, etc., and the substrate material may be glass, plastic, ceramic material or other suitable materials.

The alignment layers 33 which are coated on the inner surfaces of the first substrate 31 and the second substrate 36, respectively, are configured to assist in controlling the alignment direction of liquid crystal molecules. For example, after the driving voltages applied to the driving electrodes are removed, liquid crystal molecules which are in contact with the surfaces of the substrates are returned to the initial state by viscoelasticity. The material of the alignment layers 33 may be polyimide, polysilane, oxidized resin, polyester or other suitable materials. The process of preparing the alignment layers 33 may comprise, but may not be limited to, a process such as rubbing alignment, photo-alignment, ion beam alignment or the like.

The spacers 35 are filled between the first substrate 31 and the second substrate 36, and are configured to support the structure of the liquid crystal cell, to strengthen the thickness of the cell, and the like. The spacers 35 may be columnar spacers or spherical spacers, and the spherical spacers may be, for example, resin spheres, silicon spheres, metal spheres or other suitable materials. Moreover, when the spacers 35 are conductive materials such as metal spheres, the spacers 35 can also be used for electrical connection of the first driving electrodes 321 and the second driving electrodes 322.

For example, the photoelectric detecting component 40 is disposed on a light entering side of the second substrate 36. The photoelectric detecting component 40 is configured to detect the change in the intensity of the light at different positions after the angular movement of the polarization light source 10, and is configured to transmit the detecting signals to a controller (not shown). The photoelectric detecting component 40 may comprise various forms, for example, comprise a plurality of photoelectric detecting units, and each of the photoelectric detecting units comprises a photoelectric conversion electrode(s). These photoelectric conversion electrodes are in an array arrangement in a predetermined region on the second substrate 36. The position of the photoelectric detecting component 40 is not limited, and may be disposed on the light entering side of the second substrate 36, may be disposed on the light emitting side of the second substrate 36, or may be disposed at other suitable positions, for example, disposed on another substrate that is independent of the second substrate 36.

For example, the material of the photoelectric conversion electrodes of the photoelectric detecting component 40 may be an inorganic semiconductor material, an organic semiconductor material or the like, and the inorganic semiconductor material is, for example, a TiO2 film, a ferroelectric film or other film materials which can be photoelectrically converted. A single photoelectric conversion electrode (for example, a pixel unit) may be in any size, for example, a minimum size at the limit that allows photoelectric conversion to be performed, and as the size is smaller, the accuracy of the measurement is higher. The shape of a single photoelectric conversion electrode can be a square, rectangle, circle, or other suitable shapes. The process of preparing the photoelectric conversion electrode comprises, but is not limited to, a sputtering coating process.

Figure 3:
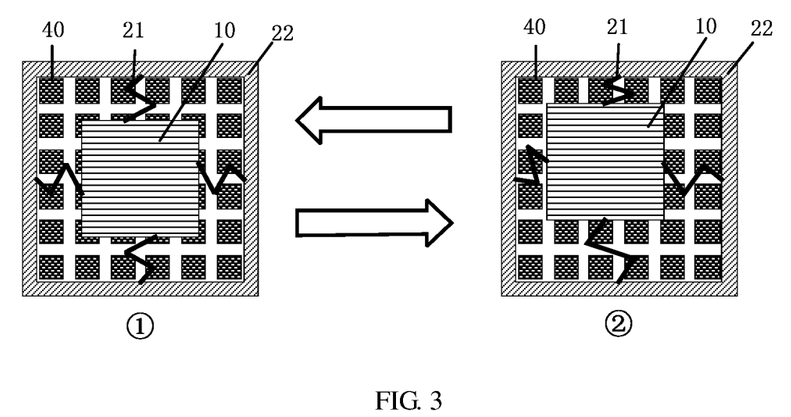
FIG. 3 is a schematic diagram showing the working principle of the gyroscope illustrated in FIG. 2 provided by an embodiment of the present disclosure.

FIG. 3 is a schematic diagram showing the working principle of the gyroscope illustrated in FIG. 2 provided by an embodiment of the present disclosure. In the embodiment of FIG. 3, the polarization light source 10 has a profile of square shape, and is connected to the square frame 22 by four elastomers (springs) 21. The photoelectric detecting component 40 includes a plurality of photoelectric conversion electrodes in a square array arrangement, and the square array is basically corresponding to the opening of the square frame 22.

Referring to FIG. 3, the view ① is a bottom view of the gyroscope in the initial state, and the view ② is a bottom view of the gyroscope after the angular movement. In the initial state, i.e., without any angular movement, the polarization light source 10 is at an initial position, such as the center of the opening of the square frame 22, and the elastomers 21 which are connected to the polarization light source 10 have initial deformation. The polarized direction of the light emitted by the polarization light source 10 is identical to the long-axis direction of liquid crystal molecules in the liquid crystal layer 341 into which the dichroic dye is added. In this case, the intensity of the polarization light irradiated onto the photoelectric detecting component 40 through the polarization analyzing component for polarization light 30 is the largest, and the data of the initial light intensity can be detected by the photoelectric detecting component 40. After the movement of the gyroscope, such as an angular movement, the polarization light source 10 has a certain angle change and a certain position change with respect to the frame 22, so the polarized direction of the light emitted by the polarization light source 10 changes, for example, relative to the frame 22, and the alignment direction of liquid crystal molecules remains unchanged, that is, the alignment direction of liquid crystal molecules does not change relative to the frame 22. Therefore, the polarized direction of the polarization light has a deflection relative to the long-axis direction of liquid crystal molecules, so the intensity of the light irradiated onto the photoelectric detecting component 40 through the polarization analyzing component for polarization light 30 may change in various degrees. Different current or voltage information is detected by the photoelectric detecting component 40. The obtained current information or voltage information, for example, is subject to an analog-to-digital conversion, and then is calculated to obtain the position change and angle change of the polarization light source 10, to obtain corresponding motion parameters such as an angular velocity, an acceleration or the like.

In another example, the polarization analyzing component for polarization light 30 in the liquid crystal cell includes the first driving electrodes and the second driving electrodes which are configured to drive liquid crystal molecules. In this case, the driving voltages which are applied to the driving electrodes can be adjusted by a controller (not shown), and the highest transmittance of the liquid crystal layer can be determined by controlling the deflection of liquid crystal molecules, so that the values of driving voltages corresponding to the highest light intensity and the highest transmittance can be determined, and the deflection angle of liquid crystal molecules that match with the values can also be accordingly obtained for example through a look-up table or the like. The position change information of the angular movement of the polarization light source 10 can be obtained by the change of the detected position of the photoelectric detecting component 40. In this case, the obtained angle change information of the angular movement can be detected and verified by the combination of changes in the light intensity and in the driving voltages. Therefore, the angular movement of the polarization light source 10 can be obtained by comprehensive processing on data. After the angular movement ends, the polarization light source 10 can be returned to the initial state. The change of the angular movement can be detected by detecting the change in the light intensity and changes in the driving voltages, and the combination of two detecting methods involving optical detection and electrical detection allows the sensitivity, the detecting accuracy and the consistency of measuring basis to be improved.

It should be noted that, in each embodiment of the present disclosure, the detecting method can be the above-mentioned combination of the optical detection and the electrical detection, and can also only comprise the optical detection, that is, after the angular movement of the polarization light source 10, the change in light intensity is detected by the photoelectric detecting component 40, so that the angular movement of the polarization light source 10 is obtained (optical detection), and there is no need to control the deflection of the liquid crystal molecules by driving voltages to perform verification (electrical detection). It should be understood that when the combination of the optical detection and the electrical detection is used, the accuracy of the detection is higher than that when only the optical detection is used. On the other hand, the optical detection is easier to implement than the combination of the optical detection and the electrical detection, and the controlling method of the optical detection is simpler.

Figure 4:
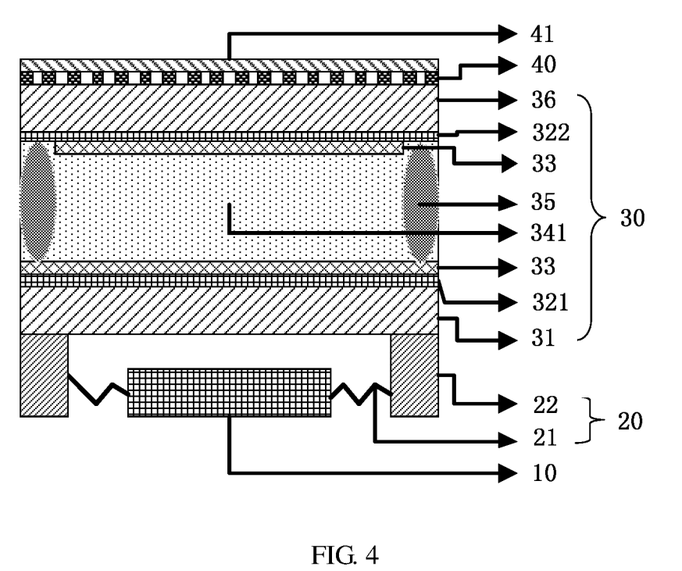
FIG. 4 is a cross-sectional schematic diagram of another gyroscope provided by an embodiment of the present disclosure.

FIG. 4 is a cross-sectional schematic diagram of another gyroscope provided by an embodiment of the present disclosure. Referring to FIG. 4, in addition to the sealing structure 20, the photoelectric detecting component 40 and the protective layer 41, the structure of the gyroscope of this embodiment is substantially identical to the gyroscope of the embodiment illustrated in FIG. 2. In this embodiment, the sealing structure 20 includes elastomers 21 and a frame 22. The elastomers 21 allows the polarization light source 10 and the frame 22 to be in a movable connection. The frame 22 is integrally formed with the first substrate 31. The manufacturing process can be reduced with the frame 22 being integrally formed on the first substrate 31, and the relative position accuracy of the frame 22 and the first substrate 31 can be improved.

In this embodiment, the photoelectric detecting component 40 is disposed on the light emitting side of the second substrate 36. This arrangement allows the distance between the photoelectric detecting component 40 and the second driving electrode 322 to be increased, thereby reducing the interference of the electrical signal of the second driving electrodes 322 to the photoelectric detecting component 40, and improving the detecting accuracy of the photoelectric detecting component 40. Certainly, the embodiment of the present disclosure is not limited thereto, and the photoelectric detecting component 40 can also be disposed on the light entering side of the second substrate 36 or be disposed at other suitable positions. The protective layer 41 is disposed on the photoelectric detecting component 40, and is mainly configured to protect and insulate the photoelectric detecting component 40. The material of the protective layer 41 is not limited, may be an inorganic insulating material such as silicon oxide, silicon nitride and the like, or may be an organic insulating material or other suitable materials. The protective layer 41 can be flexibly disposed according to the position of the photoelectric detecting component 40, and also can be disposed in one or more layers according to actual requirements.

Figure 5:
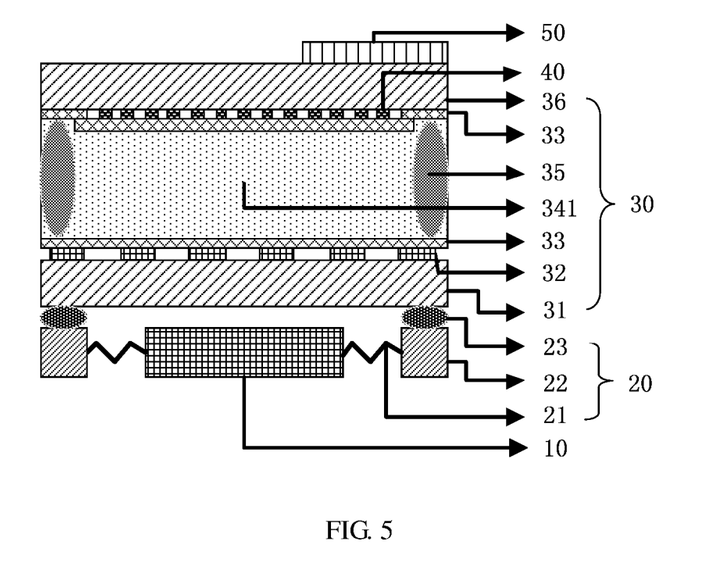
FIG. 5 is a cross-sectional schematic diagram of another gyroscope provided by an embodiment of the present disclosure.

FIG. 5 is a cross-sectional schematic diagram of another gyroscope provided by an embodiment of the present disclosure. Referring to FIG. 5, in addition to driving electrodes 32 and a controller 50, the structure of the gyroscope of this embodiment is substantially identical to the gyroscope illustrated in FIG. 2. In this embodiment, the driving electrodes 32 are disposed on the first substrate 31, and is configured to control the deflection angle of the liquid crystal molecules under the driving voltages applied by the controller 50 to ensure the consistency of the liquid crystal. The driving electrodes 32 are disposed on the same substrate, which can reduce the manufacturing process and simplify the structure of the gyroscope. Certainly, the embodiment of the present disclosure is not limited thereto, and the driving electrodes 32 may be disposed only on the first substrate 31, may be disposed only on the second substrate 36, may be divided into two groups which are disposed on the first substrate 31 and the second substrate 36, respectively, and may also be in other suitable arrangements.

In the embodiment of the figure, the controller 50 can be disposed on the light emitting side of the second substrate 36. The controller 50 is, for example, in signal connection to the photoelectric detecting component 40 and the driving electrodes 32, and is configured to receive the detecting signals of the photoelectric detecting component 40 and to control the driving voltages applied to the driving electrodes 32. Certainly, the embodiment of the present disclosure is not limited thereto. For example, in other examples, the controller 50 can be disposed on the first substrate 31, the controller 50 can be disposed outside the structure of the liquid crystal cell of the gyroscope and be electrically connected to the photoelectric detecting component 40 and the driving electrodes 32 by the flexible circuit board or the like, and the controller 50 can also be disposed by other suitable manners. For example, the controller 50 and the photoelectric detecting component 40 can be in signal connection by way of electrical connection, or can be in signal connection by any suitable manners such as wireless communication, photoelectric communication or the like. The connection between the controller 50 and the photoelectric detecting component 40 is not limited to physical connections, as long as the signal can be transmitted therebetween. The controller 50 can be implemented in various forms. For example, the controller 50 can include a processor and a memory. The processor may be a central processing unit (CPU) or other processing units having data processing capabilities and/or instruction executing capabilities, may be a general processor or a dedicated processor, and may be a processor based on an X86 or ARM architecture or the like. The memory may comprise one or more computer program products, which may comprise various forms of computer readable storage medium, such as volatile memory and/or nonvolatile memory. The volatile memory may include, for example, a random access memory (RAM) and/or a cache or the like. The nonvolatile memory may include, for example, a read only memory (ROM), a hard disk, a flash memory, or the like. One or more computer program instructions can be stored on the computer readable storage medium, and the program instructions can be executed by the processor to implement the described functions (implemented by the processor) of the embodiments of the present disclosure and/or other desired functions. Various applications and various data, such as the data of motion state, and the various data that is used and/or generated by the application may also be stored in the computer readable storage medium.

Figure 6:
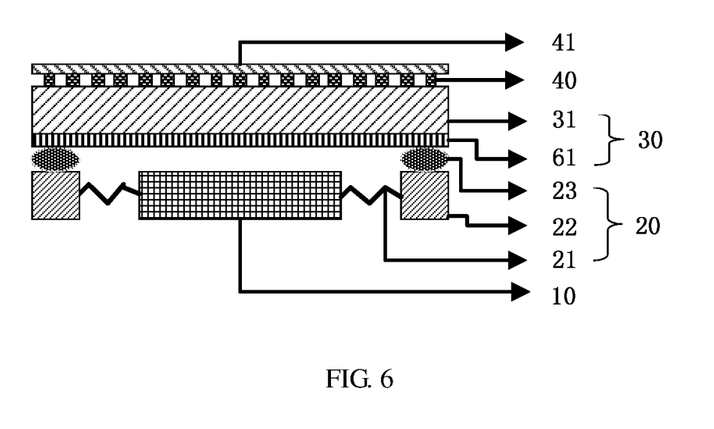
FIG. 6 is a cross-sectional schematic diagram of a gyroscope provided by another embodiment of the present disclosure.

FIG. 6 is a cross-sectional schematic diagram of a gyroscope provided by another embodiment of the present disclosure. Referring to FIG. 6, in addition to the polarization analyzing component for polarization light 30, the photoelectric detecting component 40 and the productive layer 41, the structure of the gyroscope of this embodiment is substantially identical to the gyroscope illustrated in FIG. 2. In this embodiment, the polarization analyzing component for polarization light 30 includes the first substrate 31 and a first polarizer 61. The first polarizer 61 is disposed on the light entering side of the first substrate 31. The transmittance of the first polarizer 61 has a high sensitivity characteristic to the polarized direction of the polarization light, so that the position change and the angle change of the polarization light source 10 with respect to the polarization analyzing component for polarization light 30 can be sensed. The polarized direction of the first polarizer 61 and the polarized direction of the polarization light source 10 are not limited, and may be a parallel relationship, a vertical relationship or other suitable positional relationship, as long as the information of the initial position is recorded as a reference to compare with the angular movement. The first substrate 31 is configured to support, protect or the like, and the substrate material may be glass, plastic, ceramic material or other suitable materials. The first polarizer 61 may be one of polarizers of various types, such as a polyvinyl alcohol (PVA) polarizer, etc., which is not limited in the embodiment of the present disclosure.

In the embodiment, the polarization analyzing component for polarization light 30 is configured to be a combination of the first polarizer 61 and the first substrate 31, which can simplify the structure of the gyroscope, reduce the volume of the gyroscope, and facilitate the gyroscope to be integrated in other devices (such as liquid crystal display panels).

The photoelectric detecting component 40 is disposed on the light emitting side of the first substrate 31. Certainly, the embodiment of the present disclosure is not limited thereto, and the photoelectric detecting component 40 can also be disposed on the light entering side of the first substrate 31 or be disposed at other suitable positions. The protective layer 41 is disposed on the photoelectric detecting component 40, and is mainly configured to protect and insulate the photoelectric detecting component 40. The material of the protective layer 41 is not limited, may be an inorganic insulating material such as silicon oxide, silicon nitride and the like, may be an organic insulating material such as resin, or may be other suitable materials. The protective layer 41 can be flexibly disposed according to the position of the photoelectric detecting component 40, and also can be disposed in one or more layers according to actual requirements.

The working principle of the embodiment is as follows. In the initial state, that is, without any angular movement, the polarization light source 10 is at the initial position, and the elastomers 21 which are connected to the polarization light source 10 have initial deformation. The intensity of the light irradiated onto the photoelectric detecting component 40 through the polarization analyzing component for polarization light 30 is at an initial value, and the initial data of the light intensity can be detected by the photoelectric detecting component 40. After the angular movement of the gyroscope, the polarization light source 10 produces a certain angle change and a certain position change, and the direction of polarization detecting of the first polarizer 61 remains unchanged. Therefore, the polarized direction of the polarization light has a deflection relative to the direction of polarization detecting of the first polarizer 61, so that the intensity of the light irradiated onto the photoelectric detecting component 40 through the polarization analyzing component for polarization light 30 may change in various degrees, and various current changes can be detected by the photoelectric detecting component 40. The controller (not shown) receives the detecting signals of the photoelectric detecting component 40. The position change information of the angular movement can be obtained by the change of the detected position of the photoelectric detecting component 40, and the angle change information of the angular movement can be obtained by the change in the light intensity. Therefore, the angular movement or the like of the polarization light source 10 can be obtained by a comprehensive processing on data. After the angular movement ends, the polarization light source 10 can be returned to the initial state. It is simple in principle, easy to implement, high in detecting accuracy and long in service life to detect the change of the angular movement by detecting the change in the light intensity.

Figure 7:
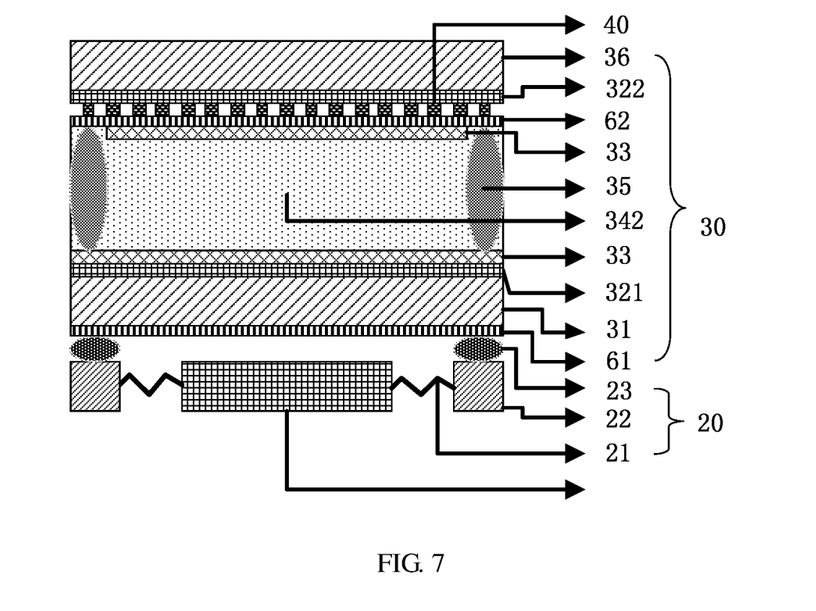
FIG. 7 is a cross-sectional schematic diagram of a gyroscope provided by another embodiment of the present disclosure.

FIG. 7 is a cross-sectional schematic diagram of a gyroscope provided by another embodiment of the present disclosure. Referring to FIG. 7, in addition to a first polarizer 61, a second polarizer 62 and a liquid crystal layer 342, the structure of the gyroscope of this embodiment is substantially identical to the gyroscope illustrated in FIG. 2. Alternatively, with respect to the embodiment illustrated in FIG. 6, in addition to the first polarizer 61, a second polarizer 62 and a liquid crystal layer 342 are added, and the liquid crystal layer 342 is in a liquid crystal cell formed of two substrates. The first polarizer 61 and the second polarizer 62 are respectively disposed on the two substrates.

In this embodiment, the first polarizer 61 is disposed on the light entering side of the first substrate 31, and the second polarizer 62 is disposed on the light entering side of the second substrate 36. The polarized direction of the first polarizer 61 is perpendicular to the polarized direction of the second polarizer 62. The liquid crystal layer 342 is filled between the first substrate 31 and the second substrate 36. Here, the liquid crystal layer 342 is not added with a dichroic dye, and the first polarizer 61, the second polarizer 62, and the liquid crystal layer 342 are configured to work in cooperation with each other to implement detection or the like. The liquid crystal layer 342 has a function of deflecting light, and allows the polarized direction of the polarization light that has passed through the first polarizer 61 to be rotated by a certain angle, thereby allowing the polarization light to be emitted from the second polarizer 62. Because the transmittance of the first polarizer 61 has a high sensitivity characteristic to the polarized direction of the polarization light, after the angular movement of the polarization light source 10, the intensity of the polarization light through the first polarizer 61 changes, and after the deflection of the molecules of the liquid crystal layer 342, the polarization light is emitted from the second polarizer 62 and is detected by the photoelectric detecting component 40, so that the position change and the angle change of the polarization light source 10 with respect to the polarization analyzing component for polarization light 30 can be obtained by optical detection. With the above-described structure, that is, the liquid crystal layer 342 and the second polarizer 62 are added on the basis of the first polarizer 61, the detecting accuracy can be improved, the interference of the unnecessary optical path can be avoided, and it is more suitable for integration with display devices. In this embodiment, the driving electrodes, such as the first driving electrodes 321 and the second driving electrodes 322, may also be disposed on the two substrates for periodically resetting and calibrating the liquid crystal layer 342 to ensure the consistency of the state of liquid crystal molecules in the liquid crystal layer 342 during each measurement process of the angular movement.

It should be noted that, in this embodiment, the positions of the first polarizer 61 and the second polarizer 62 are not limited, and may be flexibly disposed according to actual requirements, and the types of the polarizers are not limited. The polarized direction of the first polarizer 61 and the polarized direction of the polarization light source 10 are not limited, and may be a parallel relationship, a vertical relationship or any positional relationship as long as the information of the initial positions is recorded as a reference to compare with the angular movement.

At least one embodiment of the present disclosure further provides an electronic device, and the electronic device comprises a gyroscope provided by any one of the embodiments of the present disclosure. With the gyroscope integrated therein, the electronic device can realize the function of detecting an angular movement, and the detecting result can be applied to other applications. The electronic device has advantages of low cost, simple structure, accurate measurement, high precision, and the like, and at least one embodiment comprising the liquid crystal cell is compatible with TFT-LCD production lines, which facilitates integration with display devices during manufacturing process and reduces the manufacturing cost.

Figure 8:
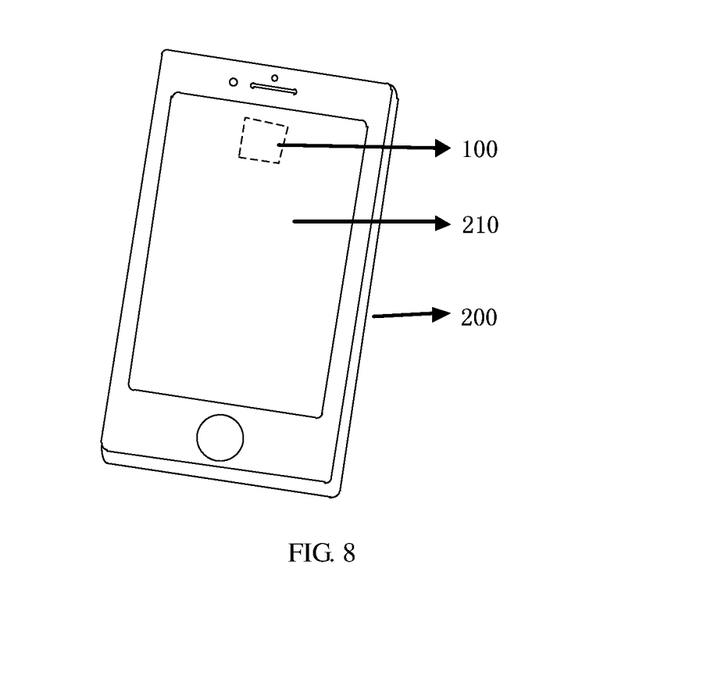
FIG. 8 is a schematic diagram of an appearance of an electronic device provided by an embodiment of the present disclosure.

FIG. 8 is a schematic diagram of an appearance of an electronic device provided by an embodiment of the present disclosure. Referring to FIG. 8, the electronic device is a mobile phone 200, including a liquid crystal display screen 210 and a gyroscope 100. The gyroscope 100 is a gyroscope provided by any one of the embodiments of the present disclosure, and is integrated in the liquid crystal display screen 210. When the mobile phone 200 is tilted or deflected, that is, when an angular movement occurs, the gyroscope 100 simultaneously experiences the angular movement, so that the angular movement can be detected, and the detecting result of the angular movement is transmitted to the processor of the mobile phone 200, for example, in the form of digital information (not shown in the figure). According to a combination of the detecting result of the angular movement and the running application, the processor of the mobile phone 200 provides the user with more operation choices and a better user experience. Because the structure of the gyroscope 100 is similar to the structure of the liquid crystal display screen 210, the gyroscope 100 can be integrated in the liquid crystal display screen 210, which can reduce the manufacturing process, reduce the number of components in the mobile phone 200, and improve the reliability of the mobile phone 200.

It should be noted that, in each embodiment of the present disclosure, the electronic device is not limited to the mobile phone 200, and may be an e-book, a tablet computer, a game consoles, or other suitable electronic devices. The display screen of the electronic device is not limited to the liquid crystal display screen 210, and may also be an OLED display screen or other suitable display screen. The integrated position of the gyroscope 100 is not limited, and the gyroscope 100 may be integrated on the display screen of the electronic device, or may be integrated on an inner surface of the cover of the electronic device or integrated at other suitable positions.

At least one embodiment of the present disclosure further provides a method of detecting an angular velocity, and the method comprises: allowing a light source that is movable to perform an angular movement with a motion state of a detected object; allowing light emitted by the light source to be irradiated onto a photoelectric detecting component, and allowing illumination areas irradiated onto the photoelectric detecting component in different motion states to be different; obtaining a detecting result provided by the photoelectric detecting component; and obtaining a change in intensity of the light irradiated onto the photoelectric detecting component from the detecting result to obtain the angular movement of the light source. For example, the method can be implemented by using a gyroscope provided by any one of the above embodiments, and the angular movement can be accurately detected. The method is simple, easy to implement and high in detecting accuracy.

Figure 9:
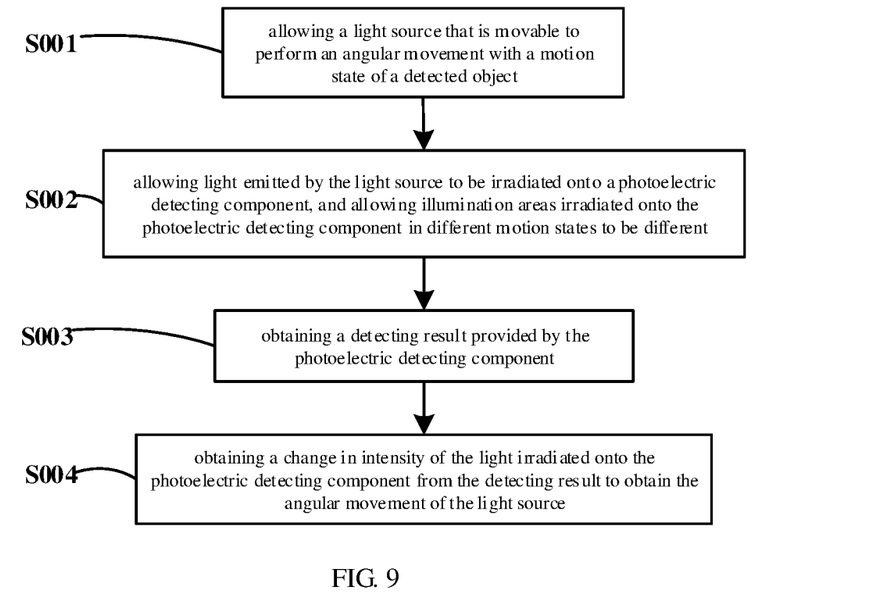
FIG. 9 is a flowchart of a method of detecting an angular velocity provided by an embodiment of the present disclosure.

FIG. 9 is a flowchart of a method of detecting an angular velocity provided by an embodiment of the present disclosure. Referring to FIG. 9, the method of detecting the angular velocity includes the following steps.

Step S001: allowing a light source that is movable to perform an angular movement with a motion state of a detected object.

Step S002: allowing light emitted by the light source to be irradiated onto a photoelectric detecting component, and allowing illumination areas irradiated onto the photoelectric detecting component in different motion states to be different.

Step S003: obtaining a detecting result provided by the photoelectric detecting component.

Step S004: obtaining a change in intensity of the light irradiated onto the photoelectric detecting component from the detecting result to obtain the angular movement of the light source.

Figure 10:
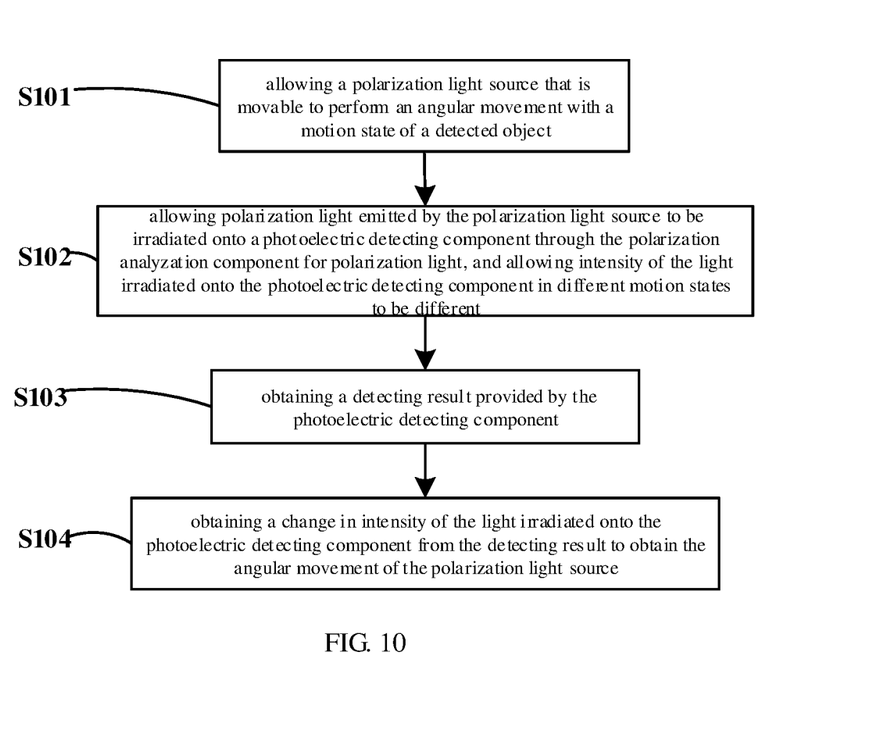
FIG. 10 is a flowchart of another method of detecting the angular velocity provided by an embodiment of the present disclosure.

FIG. 10 is a flowchart of another method of detecting the angular velocity provided by an embodiment of the present disclosure. Referring to FIG. 10, the method of detecting the angular velocity includes the following steps.

Step S101: allowing a polarization light source that is movable to perform an angular movement with a motion state of a detected object.

Step S102: allowing polarization light emitted by the polarization light source to be irradiated onto a photoelectric detecting component through the polarization analyzing component for polarization light, and allowing intensity of the light irradiated onto the photoelectric detecting component in different motion states to be different.

Step S103: obtaining a detecting result provided by the photoelectric detecting component.

Step S104: obtaining a change in intensity of the light irradiated onto the photoelectric detecting component from the detecting result to obtain the angular movement of the polarization light source.

In various embodiments of the present disclosure, the polarization analyzing component for polarization light described in step S102 can be implemented in various manners. The polarization analyzing component for polarization light can be implemented by adding a dichroic dye to the liquid crystal layer, can be implemented by a polarizer structure, or can be implemented by other suitable manners, which is not limited in the embodiment of the present disclosure, and is only required to ensure that the polarization analyzing component for polarization light has a high sensitivity characteristic to the polarized direction of the polarization light.

Figure 11:
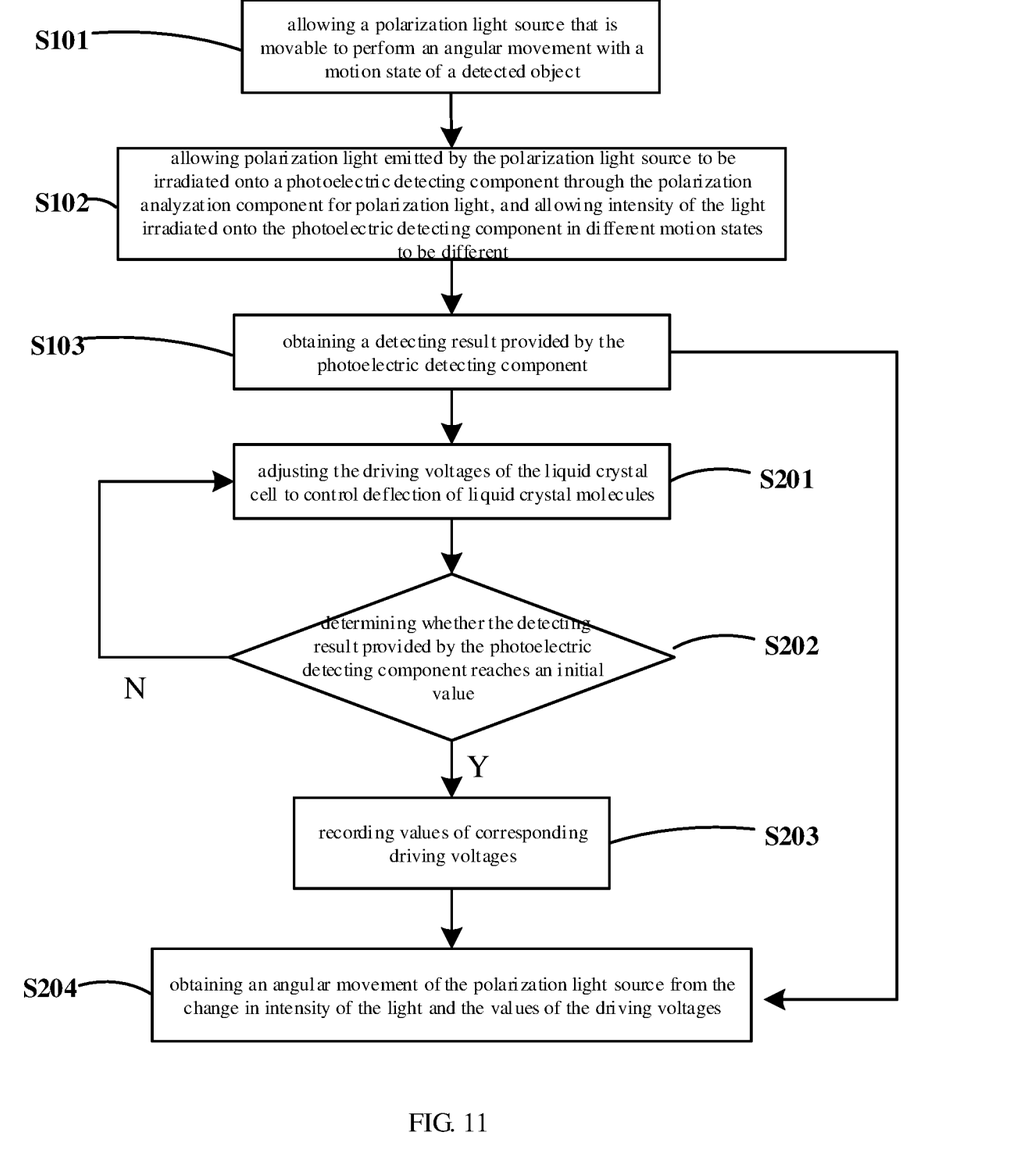
FIG. 11 is a flowchart of another method of detecting the angular velocity provided by an embodiment of the present disclosure.

FIG. 11 is a flowchart of another method of detecting the angular velocity provided by an embodiment of the present disclosure. Referring to FIG. 11, in addition to steps S201, S202, S203 and S204, the method of detecting the angular velocity of this embodiment is substantially the same as the method of detecting the angular velocity as illustrated in FIG. 10. In this embodiment, the polarization analyzing component for polarization light includes a liquid crystal cell, and the liquid crystal cell includes a liquid crystal layer. The liquid crystal layer in the liquid crystal cell includes liquid crystal into which a dichroic dye is added. A deflection angle of liquid crystal molecules in the liquid crystal layer is controlled by driving voltages of the liquid crystal cell. Subsequent to obtaining the detecting result provided by the photoelectric detecting component by step S103, the following steps are performed.

Step S201: adjusting the driving voltages of the liquid crystal cell to control deflection of liquid crystal molecules.

Step S202: determining whether the detecting result provided by the photoelectric detecting component reaches an initial value; if yes, performing step S203; and if not, returning to step S201.

Step S203: recording values of corresponding driving voltages.

Step S204: obtaining an angular movement of the polarization light source from the change in intensity of the light and the values of the driving voltages.

It should be noted that, in each embodiment of the present disclosure, the method of detecting the angular velocity may be at least partially implemented by software, hardware, firmware, or any combination thereof. Also, the flow of the method of detecting the angular velocity may include more or fewer steps, which may be performed sequentially or in parallel. Although the flow of the method of detecting the angular velocity described above includes a plurality of steps performed in a specific order, it should be clearly understood that the order of the plurality of steps is not limited. The flow of the method of detecting the angular velocity described above may be performed only once, may be performed multiple times at predetermined time intervals, or may be performed cyclically.

What have been described above are only specific implementations of the present disclosure, the protection scope of the present disclosure is not limited thereto, the modification or replacement that are easily conceived by those skilled in the related art in the technical scope of the present disclosure should be in the protection scope of the present disclosure, and the protection scope of the present disclosure should be based on the protection scope of the claims.

What is claimed is:

1. A gyroscope, comprising: a photoelectric detector and a light source,
   wherein the light source is movable relative to the photoelectric detector, and light emitted by the light source is able to be irradiated onto the photoelectric detector,
   wherein the light source is a polarization light source;
   the gyroscope further comprises a polarization analyzer for polarization light;
   wherein the polarization light source is movable relative to the polarization analyzer for polarization light, and polarization light emitted by the polarization light source is able to be irradiated onto the photoelectric detector through the polarization analyzer for polarization light.

2. The gyroscope according to claim 1, wherein the polarization analyzer for polarization light comprises:
- a first substrate and a second substrate opposite to each other; and
- a liquid crystal layer between the first substrate and the second substrate, wherein the liquid crystal layer comprises a dichroic dye among liquid crystal molecules.

3. The gyroscope according to claim 1, wherein the polarization analyzer for polarization light comprises:
- a first substrate, and
- a first polarizer on the first substrate.

4. The gyroscope according to claim 3, wherein the polarization analyzer for polarization light further comprises:
- a second substrate,
- a second polarizer on the second substrate, and
- a liquid crystal layer between the first substrate and the second substrate.

5. The gyroscope according to claim 2, further comprising driving electrodes,
- wherein the driving electrodes are on the first substrate and/or on the second substrate to drive deflection of liquid crystal molecules in the liquid crystal layer.

6. The gyroscope according to claim 5, further comprising a controller,
- wherein the controller is configured to be in signal connection to the photoelectric detector to receive a detecting signal of the photoelectric detector, and is configured to control driving voltages applied to the driving electrodes.

7. The gyroscope according to claim 1, further comprising an elastomer,
- wherein the elastomer allows the light source and the photoelectric detector to be directly or indirectly connected, and
- an end, which is far away from the light source, of the elastomer is further connected to a power supply to supply power to the light source.

8. The gyroscope according to claim 2, wherein the photoelectric detector is on a light emitting side of the second substrate.

9. An electronic device, comprising a gyroscope,
- wherein the gyroscope comprises: a photoelectric detector and a light source,
- the light source is movable relative to the photoelectric detector, and light emitted by the light source is able to be irradiated onto the photoelectric detector,
- wherein the light source is a polarization light source;
- the gyroscope further comprises a polarization analyzer for polarization light;
- wherein the polarization light source is movable relative to the polarization analyzer for polarization light, and polarization light emitted by the polarization light source is able to be irradiated onto the photoelectric detector through the polarization analyzer for polarization light.

10. A method of detecting an angular velocity, comprising:
- allowing a light source that is movable to perform an angular movement with a motion state of a detected object;
- allowing light emitted by the light source to be irradiated onto a photoelectric detector, and allowing illumination areas irradiated onto the photoelectric detector in different motion states to be different;
- obtaining a detecting result provided by the photoelectric detector; and
- obtaining a change in intensity of the light irradiated onto the photoelectric detector from the detecting result to obtain the angular movement of the light source,
- wherein the light source is a polarization light source, and allowing the light emitted by the light source to be irradiated onto the photoelectric detector, and allowing illumination areas irradiated onto the photoelectric detector in different motion states to be different, comprises:
  - allowing polarization light emitted by the polarization light source to be irradiated onto the photoelectric detector through the polarization analyzer for polarization light, and allowing intensity of the polarization light irradiated onto the photoelectric detector in different motion states to be different.

11. The method of detecting the angular velocity according to claim 10, wherein the polarization analyzer for polarization light comprises a liquid crystal cell, and the liquid crystal cell comprises a liquid crystal layer;
- the liquid crystal layer in the liquid crystal cell comprises liquid crystal into which a dichroic dye is added;
- a deflection angle of liquid crystal molecules in the liquid crystal layer is controlled by driving voltages of the liquid crystal cell, and the method further comprises:
  - subsequent to obtaining the detecting result provided by the photoelectric detector, adjusting the driving voltages of the liquid crystal cell to control deflection of liquid crystal molecules, allowing the detecting result provided by the photoelectric detector to reach an initial value, and recording corresponding values of the driving voltages; and
  - obtaining an angular movement of the polarization light source from the change in intensity of the light and the corresponding values of the driving voltages.

12. The gyroscope according to claim 4, further comprising driving electrodes,
- wherein the driving electrodes are on the first substrate and/or on the second substrate to drive deflection of liquid crystal molecules in the liquid crystal layer.

13. The gyroscope according to claim 12, further comprising a controller,
- wherein the controller is configured to be in signal connection to the photoelectric detector to receive a detecting signal of the photoelectric detector, and is configured to control driving voltages applied to the driving electrodes.

14. The gyroscope according to claim 4, wherein the photoelectric detector is on a light emitting side of the second substrate.

15. The gyroscope according to claim 2, further comprising an elastomer,
- wherein the elastomer allows the light source and the photoelectric detector to be directly or indirectly connected, and
- an end, which is far away from the light source, of the elastomer is further connected to a power supply to supply power to the light source.

16. The gyroscope according to claim 3, further comprising an elastomer,
- wherein the elastomer allows the light source and the photoelectric detector to be directly or indirectly connected, and
- an end, which is far away from the light source, of the elastomer is further connected to a power supply to supply power to the light source.

* * * * *